Patented July 29, 1941

2,250,520

UNITED STATES PATENT OFFICE 2,250,520

MANUFACTURE OF UNSATURATED ESTERS

Joseph E. Bludworth, Cumberland, Md., assignor to Celanese Corporation of America, a corporation of Delaware.

No Drawing. Application August 16, 1938,
Serial No. 225,098

9 Claims. (Cl. 260—486)

This invention relates to the manufacture of esters of unsaturated acids, and relates more particularly to the manufacture of esters of methacrylic acid.

It is an object of this invention to provide an economic and expeditious method of producing esters of methacrylic acid.

Another object of this invention is the production of methallyl methacrylate from methacrolein.

Still another object of this invention is the production of alkyl and polyhydric alcohol esters of methacrylic acid.

Other objects of this invention will appear from the following detailed description and the claims.

In accordance with this invention methallyl methacrylate is prepared by the condensation of methacrolein in the presence of aluminum alcoholates, such as aluminum ethoxide or aluminum methallyl oxide, as catalyst. I prefer, however, to use aluminum methallyl oxide as the catalyst.

Due to the difficulty of forming aluminum methallyl oxide directly, it is preferred to form the same in the following manner: Aluminum is activated by being given a surface treatment with a small amount of absolute ethyl alcohol containing a trace, i. e., about 0.5%, each of mercuric chloride and iodine. This treatment forms a coating of aluminum ethoxide on the surface of the aluminum, sufficient ethyl alcohol being used to combine with about 5% of the aluminum employed. Methallyl alcohol is then added and the mixture is refluxed to complete the reaction and to drive off the ethyl alcohol. While the aluminum methallyl oxide may be employed alone as catalyst in the process of the instant invention, I have found that better results are obtained by adding to the aluminum methallyl oxide a small amount, i. e., from 5 to 10%, based on the weight of the aluminum chloride as an activator.

The condensation is carried out by slowly adding one part by weight of methacrolein to one part by weight of catalyst dispersed in ethyl acetate or other anhydrous solvent, the mixture being cooled and stirred during the addition. When all of the methacrolein has been added the mixture is slowly heated under reflux until the odor of the methacrolein disappears. The catalyst is then filtered out and the filtrate fractionated to separate the methallyl methacrylate formed from the solvent employed. The methallyl methacrylate is preferably distilled under vacuum.

The formation of methallyl methacrylate may be illustrated by the following detailed example, it being understood, however, that it is in no way limitative:

100 grams of finely divided aluminum methallyl oxide are suspended in 300 grams of ethyl acetate and 100 grams of methacrolein are slowly added thereto with cooling and stirring. The mixture is then heated until the solvent refluxes (77 deg. C.), and the heating is continued until the odor of methacrolein disappears. The catalyst, aluminum methallyl oxide, is then removed by filtration and the ethyl acetate is removed from the methallyl methacrylate by fractionation. The yield is about 80 grams of methallyl methacrylate per 100 grams of methacrolein.

Part of the methallyl oxide can be recovered from the spent catalyst by heating it under vacuum and condensing the aluminum alcoholate which sublimes at about 250 deg. C. at 40 millimeters of mercury.

The methallyl methacrylate may be polymerized with the aid of radiant energy such as light, heat or ultra violet rays, a catalyst such as benzoyl peroxide, or otherwise, to form a resin. During the polymerization the methallyl methacrylate may be shaped to form any suitable articles such as sheets, films, filaments, rods, cubes or any other articles of predetermined configuration. The shaping of the articles may be effected by partially polymerizing the methallyl methacrylate monomer until it becomes a viscous liquid, which viscous liquid is then poured into molds, cast upon casting wheels or plates, extruded through suitable orifices, or injected into molds with the aid of injection molding devices. In order to overcome the danger of the formation of bubbles in the material during polymerization, it is advisable first to form the polymer then to finely divide this polymer. This finely divided polymer is added to the monomer after which the final polymerization and shaping is effected. Any suitable effect materials may be added to the mixture or to one of the constituents thereof prior to the setting up or solidification of the polymer.

The polymerized methallyl methacrylate may be used as sheet material for the production of glass for airplanes, in the manufacture of safety glass and for other articles where exceptionally clear, homogeneous sheet material is required.

The methallyl methacrylate may be employed for the production of methacrylates of other alcohols. For example, the methallyl methacrylate may be refluxed with an excess of an alcohol, such as methyl alcohol, ethyl alcohol, propyl alcohol, iso-propyl alcohol, butyl alcohol, glycols or glycerols, in the presence of an acid catalyst to promote the alcoholysis. Hydroquinone is added to the reaction mixture to prevent polymerization. The excess alcohol is then distilled off and the méthacrylate of the alcohol employed is separated by fractionation from the methallyl alcohol formed and the unchanged methallyl methacrylate. The methallyl methacrylate may be used again after the separation of the methallyl alcohol.

As an example illustrating the alcoholysis, the following is given: A mixture consisting of 100 grams of methallyl methacrylate, 1 gram of hydroquinone, 3 grams of phosphoric acid and 100 grams of ethyl alcohol is refluxed at 65 deg. C. for twelve hours. The excess ethyl alcohol is distilled off and the ethyl methacrylate formed is fractionated from the mixture. About 43 grams of ethyl methacrylate are obtained which is a yield of 60% based on the amount of methallyl methacrylate used. The residue from the distillation contains 40 grams of the methallyl methacrylate and 31 grams of methallyl alcohol formed by the reaction.

It is to be understood that the foregoing detailed description is merely given by way of illustration and that many variations may be made therein without departing from the spirit of my invention.

Having described my invention, what I desire to secure by Letters Patent is:

1. Method of forming methallyl methacrylate which comprises mixing methacrolein with an aluminum alcoholate, heating the mixture under reflux and separating the methallyl methacrylate formed from the reaction mixture.

2. Method of forming methallyl methacrylate which comprises mixing methacrolein with aluminum methallyl oxide, heating the mixture under reflux and separating the methallyl methacrylate formed from the reaction mixture.

3. Method of forming methallyl methacrylate, which comprises adding methacrolein to a suspension of an aluminum alcoholate in a carrying agent, cooling and stirring the mixture during the addition of said methacrolein, heating said mixture under reflux until the odor of methacrolein disappears, filtering the reaction mixture to remove the aluminum alcoholate and separating the methallyl methacrylate from said carrying agent.

4. Method of forming methallyl methacrylate, which comprises adding methacrolein to a suspension of aluminum ethoxide in ethyl acetate, cooling and stirring the mixture during the addition of said methacrolein, heating said mixture under reflux until the odor of methacrolein disappears, filtering the reaction mixture to remove the aluminum ethoxide and separating the methallyl methacrylate from the ethyl acetate.

5. Method of forming methallyl methacrylate, which comprises adding methacrolein to a suspension of aluminum methallyl oxide in ethyl acetate, cooling and stirring the mixture during the addition of said methacrolein, heating said mixture under reflux until the odor of methacrolein disappears, filtering the reaction mixture to remove the aluminum methallyl oxide and separating the methallyl methacrylate from the ethyl acetate.

6. Method of forming methallyl methacrylate, which comprises adding one part by weight of methacrolein to one part by weight of an aluminum alcoholate dispersed in a carrying agent, cooling and stirring said mixture during the addition of said methacrolein, heating said mixture under reflux until the odor of methacrolein disappears, filtering the reaction mixture to remove the aluminum alcoholate and separating the methallyl methacrylate from said carrying agent.

7. Method of forming methallyl methacrylate, which comprises adding methacrolein to a suspension of aluminum methallyl oxide in ethyl acetate and containing an activator, cooling and stirring said mixture during the addition of said methacrolein, heating said mixture under reflux until the odor of methacrolein disappears, filtering the reaction mixture to remove the aluminum methallyl oxide and separating the methallyl methacrylate from the ethyl acetate.

8. Method of forming methallyl methacrylate, which comprises adding methacrolein to a suspension of aluminum methallyl oxide in ethyl acetate and containing an activator selected from the group consisting of mercuric chloride and aluminum chloride, cooling and stirring said mixture during the addition of said methacrolein, heating said mixture under reflux until the odor of methacrolein disappears, filtering the reaction mixture to remove the aluminum methallyl oxide and separating the methallyl methacrylate from the ethyl acetate.

9. Method of forming methallyl methacrylate, which comprises adding methacrolein to a suspension of an aluminum methallyl oxide in ethyl acetate, said solution containing an activator selected from the group consisting of mercuric chloride and aluminum chloride in amount equal to 5 to 10%, based on the weight of the aluminum methacrylate, cooling and stirring said mixture during the addition of said methacrolein, heating said mixture under reflux until the odor of methacrolein disappears, filtering the reaction mixture to remove the aluminum methallyl oxide and separating the methallyl methacrylate from the ethyl acetate.

JOSEPH E. BLUDWORTH.